(12) United States Patent
Meng et al.

(10) Patent No.: US 8,190,857 B2
(45) Date of Patent: May 29, 2012

(54) DELETING A SHARED RESOURCE NODE AFTER RESERVING ITS IDENTIFIER IN DELETE PENDING QUEUE UNTIL DELETION CONDITION IS MET TO ALLOW CONTINUED ACCESS FOR CURRENTLY ACCESSING PROCESSOR

(75) Inventors: Dan Meng, Beijing (CN); Xiangqing Chang, Beijing (CN); Yibin Gong, Beijing (CN); Kunpeng Zhao, Beijing (CN)

(73) Assignee: Hangzhou H3C Technologies, Co., Ltd, Zhejiang (CN)

( * ) Notice: Subject to any disclaimer, the term of this patent is extended or adjusted under 35 U.S.C. 154(b) by 784 days.

(21) Appl. No.: 12/282,779

(22) PCT Filed: Sep. 26, 2007

(86) PCT No.: PCT/CN2007/070789
§ 371 (c)(1),
(2), (4) Date: Sep. 12, 2008

(87) PCT Pub. No.: WO2008/043295
PCT Pub. Date: Apr. 17, 2008

(65) Prior Publication Data
US 2009/0070560 A1      Mar. 12, 2009

(51) Int. Cl.
*G06F 13/14* (2006.01)

(52) U.S. Cl. .......................................... 712/28; 711/150

(58) Field of Classification Search ........................ None
See application file for complete search history.

(56) References Cited

U.S. PATENT DOCUMENTS

| | | | |
|---|---|---|---|
| 5,377,352 A | | 12/1994 | Tanaka |
| 5,630,166 A | * | 5/1997 | Gamache et al. ............... 712/29 |
| 5,790,868 A | | 8/1998 | Hotea |
| 6,223,200 B1 | | 4/2001 | Barnes |
| 6,742,135 B1 | | 5/2004 | Wu |
| 7,174,434 B2 | | 2/2007 | Blumrich et al. |
| 7,313,582 B2 | | 12/2007 | Bhanot et al. |
| 7,587,516 B2 | | 9/2009 | Bhanot et al. |
| 7,650,434 B2 | | 1/2010 | Blumrich et al. |
| 2003/0061394 A1 | | 3/2003 | Buch |
| 2006/0179196 A1 | | 8/2006 | Gray |
| 2008/0244596 A1 | * | 10/2008 | Mansker et al. .............. 718/104 |
| 2009/0259713 A1 | | 10/2009 | Blumrich et al. |

FOREIGN PATENT DOCUMENTS

| | | |
|---|---|---|
| CN | 1577280 A | 2/2005 |
| EP | 0255096 | 12/1993 |
| WO | 2005/010737 A2 | 2/2005 |
| WO | 2006/030195 A2 | 3/2006 |

* cited by examiner

*Primary Examiner* — Kenneth Kim

(57) ABSTRACT

A method accelerates access of a multi-core system to its critical resources, which includes preparing to delete a critical node in a critical resource, separating the critical node from the critical resource, and deleting the critical node if the conditions for deleting the critical node are satisfied. An apparatus includes a confirmation module for the node to be deleted and a deletion module to accelerate access of a multi-core system to its critical resources.

19 Claims, 6 Drawing Sheets

DELETING A SHARED RESOURCE NODE AFTER RESERVING ITS IDENTIFIER IN DELETE PENDING QUEUE UNTIL DELETION CONDITION IS MET TO ALLOW CONTINUED ACCESS FOR CURRENTLY ACCESSING PROCESSOR

FIELD OF THE INVENTION

This application relates to multi-core technology, and more particularly, to a method and apparatus for accelerating access by a multi-core system to critical resources.

BACKGROUND

A multi-core processor uses system on chip (SOC) technology to integrate multiple general-purpose CPUs and functional components onto a single chip, where the CPUs communicate with each other and with the functional components through high-speed buses. The use of high-speed buses breaks through the performance bottleneck in communication between CPUs and CPUs/components in a traditional multi-CPU system, thus guaranteeing system performance.

The cores of a multi-core system can concurrently access a critical resource (also referred to as a shared resource). To avoid data confusion caused by multiple cores concurrently accessing the same critical node in a critical resource, a core must poll whether the critical node it is attempting to access is locked. If the critical node is locked, it waits; if the critical node is not locked, it locks the critical node first and then accesses the critical node, for example, to delete the critical node. Such a lock-and-act mechanism prevents access errors that can be caused when multiple cores access the same critical node at the same time.

Unfortunately, while preventing errors caused by concurrent accesses of cores to the same critical node, the lock-and-act mechanism of multi-core systems increases system overheads and thus reduces critical resource accessing efficiency.

SUMMARY OF THE INVENTION

The present invention provides a method and apparatus for accelerating the access of a multi-core system to its critical resources. In one method, a critical node is separated from the critical resource, and deleted if delete conditions are satisfied. Further, the where each critical resource includes at least one critical node, the method includes keeping the critical node to be deleted for a timing period in which cores that are accessing the critical node can complete their ongoing access tasks, and deleting the critical node when the timing period expires.

An apparatus for accelerating the access of a multi-core system to a critical resource includes a node to-be-deleted confirmation module and a deletion module. The node to-be-deleted confirmation module records the identification of the critical node to the deletion module to prepare for the node deletion. The deletion module locates the critical node based on the critical node identification and deletes the critical node when the conditions for deleting the critical node are satisfied.

A computer program can include instructions for a computer to execute the method. A computer storage medium can store the computed program.

Different from existing techniques, when preparing to delete a critical node from a critical resource, embodiments of the invention separate the critical node from the critical resource, and then keep the critical node for a timing period before actually deleting it. Thus, deleting a critical node has no impact on the ongoing accesses of other cores to the critical node, or the accesses of other cores to the critical resource from which the critical node is separated. Therefore, when accessing the critical resource, a core does not need to identify whether the critical resource is locked or lock the critical resource. Thus, the invention accelerates the critical resource access speed in a multi-core system.

DETAILED DESCRIPTION OF THE INVENTION

When preparing to delete a critical node in a critical resource (also referred to as a shared resource), embodiments of the invention separate the critical node from the critical resource, and then keep the critical node for a timing period before deleting it. To be more specific, embodiments of the invention keep the critical nodes to be deleted for a predefined deletion delay, or store the identifications of the critical nodes to be deleted in a predefined dedicated storage space of fixed size. When the space is full, embodiments of the invention delete the first critical node identification stored in the space, simultaneously delete the correlated critical node, and store the identification of the current critical node to be deleted in the space.

Further, in the following description of embodiments of the present invention, specific details are provided for a complete understanding of the embodiments of the invention.

Figure 1:
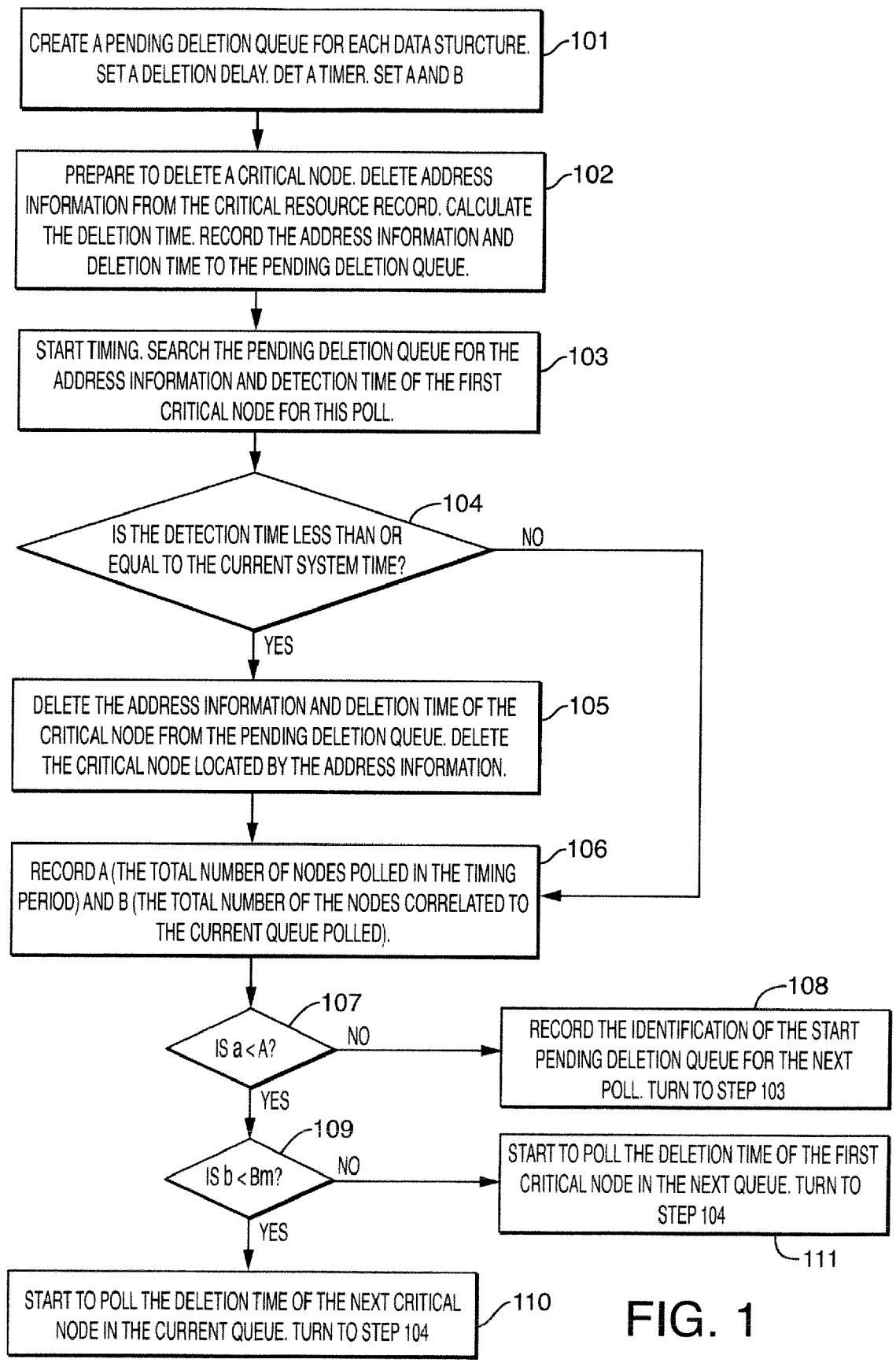
FIG. 1 is a flow chart illustrating a method of accelerating the access of a multi-core system to its critical resources in accordance with embodiment 1 of the present invention.

FIG. 1 is a flow chart illustrating a method of accelerating the access of a multi-core system to its critical resources in accordance with embodiment 1 of the present invention. As shown in FIG. 1, embodiment 1 includes the following steps:

At step 101, a pending deletion queue is created for each data structure contained in the critical resources of the multi-core system; and the deletion delay for each data structure, a timer, A (the total number of critical nodes polled in the timing period), and B1, B2, through Bn (the total number of critical nodes polled in pending deletion queue 1, 2, through n respectively, where n indicates the number of pending deletion queues) are set.

Usually, the same deletion delay is set for the same data structure. To facilitate deletion, identifications of the to-be-deleted critical nodes of the same data structure can be put in the same pending deletion queue in deletion time sequence.

The value A, based on previous experience or tests, indicates the number of critical nodes polled in the timing period. B1, B2, through Bn, which are calculated based on the number of pending deletion queues, the deletion delay of each pending deletion queue and A, indicate the number of polled critical nodes correlated to the first, second, through nth pending deletion queue respectively, in the timing period. For example, set the timing period to 1 second, the value of A to 500 based on experience, and the number of current pending deletion queues to 10. Set the deletion delay of pending deletion queue 1 to 0.5 second, and then B1=120; set the deletion delay of pending deletion queue 2 to 3 second, and then B2=30; that is, set a relatively large number of polled critical nodes for the pending deletion queue with the relatively small deletion delay and set a relative small number of polled critical nodes for the pending deletion queue with the relatively large deletion delay.

At step 102, the multi-core system prepares to delete a critical node in the critical resource, deletes the address information of the critical node from the critical resource record, calculates the deletion time according to the predefined deletion delay for the data structure, and puts the address information and deletion time of the critical node into the pending deletion queue for the data structure of the critical node.

The multi-core system maintains a critical resource record, which contains the identifications of all the critical nodes, such as their address information. To maintain the ongoing accesses of other cores to the to-be-deleted critical node, the multi-core system changes only the attribute of the critical node to non-critical resource rather than changing its address.

At step 102, the address information of the critical node is deleted from the critical resource record. Thus, ongoing accesses to the critical node are not affected; meanwhile, no other cores can access the node any longer.

The deletion time of a critical node equals the deletion delay plus the time at which the system prepares to delete the critical node.

At step 103, the timer starts and the system, based on the last recorded identification of the start pending deletion queue for next poll, searches the pending deletion queue for the address information and deletion time of the first critical node for this poll.

At step 104, the system determines whether the deletion time of the critical node is less than or equal to the current system time. If yes, the system executes step 105; if no, the system executes step 106.

At step 105, the system deletes the address information and deletion time of the critical node from the pending deletion queue, locates the critical node by the address information, and deletes the critical node.

At step 106, the system records a (the number of critical nodes polled in the timing period) and b (the number of critical nodes correlated to the current pending deletion queue polled in the timing period).

At step 107, the system determines whether a is less than A. If yes, the system executes step 109; if no, the system executes step 108.

At step 108, the system records the identification of the start pending deletion queue for next poll according to the last polled pending deletion queue. Then the system turns to step 103.

At step 109 the system determines whether b is less than Bm. If yes, the system executes step 110; if no, the system executes step 111.

Bm is a predefined value that indicates the number of polled critical nodes in current pending deletion queue m in the timing period.

At step 110, the system starts to poll the deletion time of the next critical node in the current queue. Then the system turns to step 104.

At step 111, the system starts to poll the deletion time of the first critical node in the next pending deletion queue. Then the system turns to step 104.

Note that steps 102, 103 through 111 are not order dependent. That is, once preparing to delete a critical node, the system executes 102. Once the timer starts, the system executes steps 103 through 111.

In the embodiments of the present invention, when a core accesses a critical node in a critical resource, it does not need to determine whether the critical resource is locked or lock the critical resource before accessing the critical node.

Figure 2:
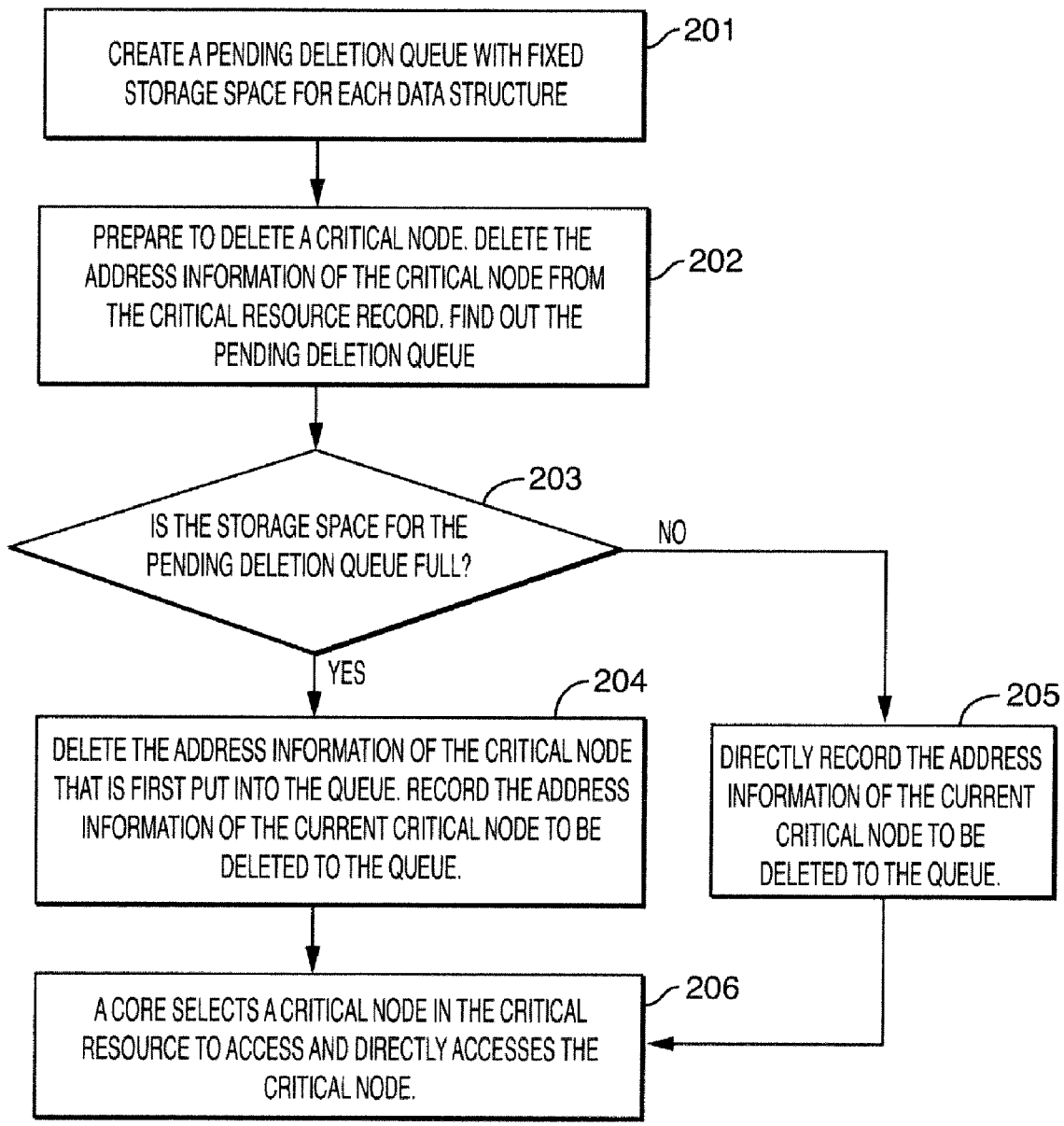
FIG. 2 is a flow chart illustrating a method of accelerating the access of a multi-core system to its critical resources in accordance with embodiment 2 of the present invention.

FIG. 2 is a flow chart illustrating a method of accelerating the access of a multi-core system to a critical resource in accordance with embodiment 2 of the present invention. As shown in FIG. 2, embodiment 2 includes the following steps:

At step 201, the system creates a pending deletion queue with fixed storage space for each data structure in the critical resource.

When creating pending deletion queues for the data structures, the system assigns a storage space size for each pending deletion queue depending on the deletion delay required by each data structure. That is, if the deletion delay required by a data structure is long, a relatively large storage space is assigned to the pending deletion queue.

At step 202, the system prepares to delete a critical node in the critical resource, deletes the address information of the critical node from the critical resource record, and searches for the pending deletion queue for the critical node according to the data structure of the critical node.

At step 203, the system determines whether the storage space for the pending deletion queue is full. If yes, the system executes step 204; if no, the system executes step 205.

At step 204, the system deletes the first critical node in the pending deletion queue (that is, deletes the address information of the critical node that is first put into the queue), simultaneously deletes the critical node located by the address information, and records the address information of the current critical node to be deleted to the pending deletion queue. Then the system turns to step 206.

At step 205, the system directly puts the address information of the current critical node to be deleted into the pending deletion queue.

At step 206, a core selects a critical node in the critical resource to access, and directly accesses the critical node.

Figure 3A:
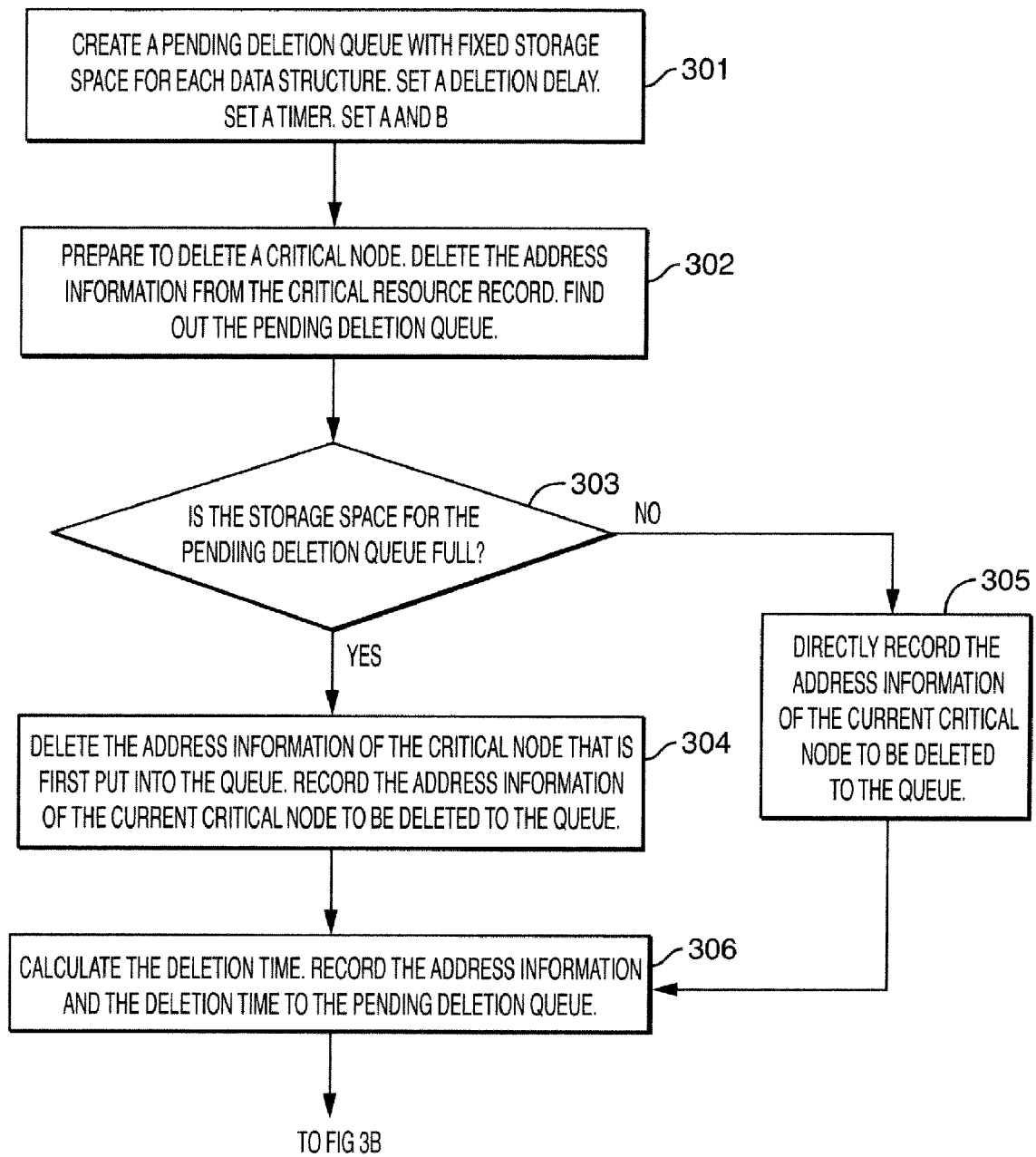
FIG. 3 is a flow chart illustrating a method of accelerating the access of a multi-core system to its critical resources in accordance with embodiment 3 of the present invention.
Figure 3B:
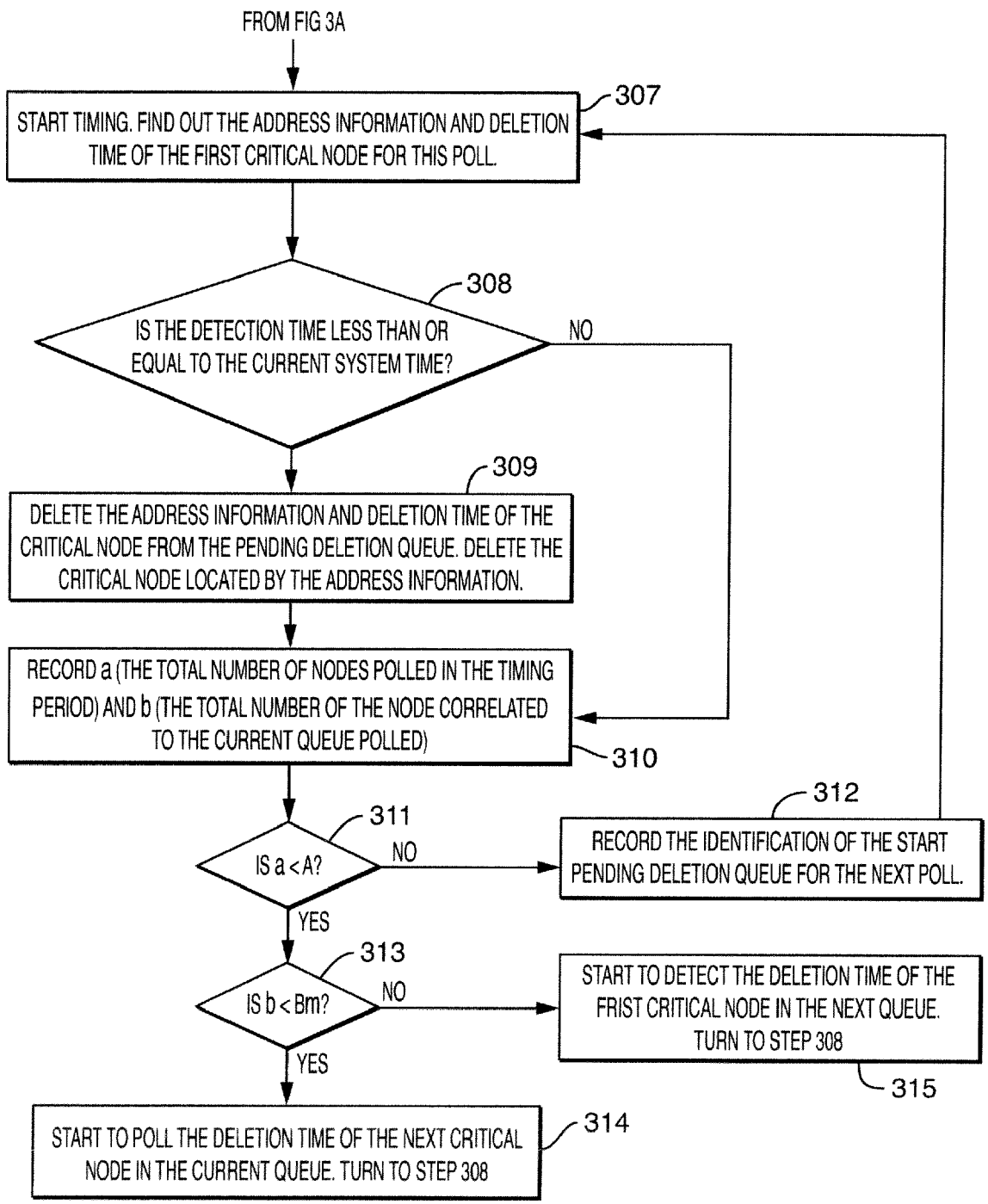

Applications of the present invention can combine embodiments 1 and 2. FIG. 3 is a flow chart illustrating a method of accelerating the access of a multi-core system to its critical resources in accordance with embodiment 3 of the present invention. As shown in FIG. 3, embodiment 3 comprises the following steps:

At step 301, a pending deletion queue with fixed-size storage space is created for each data structure contained in the critical resources of the multi-core system; the deletion delay for each data structure, a timer, A (the total number of critical nodes polled in the timing period), and B1, B2, through Bn (the total number of critical nodes polled in pending deletion queue 1, 2, through n respectively, where n indicates the number of pending deletion queues) are set.

At step 302, the multi-core system prepares to delete a critical node in the critical resource, deletes the address information of the critical node from the critical resource record, and searches for the pending deletion queue for the critical node according to the data structure of the critical node.

At step 303, the system determines whether the storage space for the pending deletion queue is full. If yes, the system executes step 304; if no, the system executes step 305.

At step 304, the system deletes the first critical node in the pending deletion queue (that is, deletes the address information of the critical node that is first put into the queue), simultaneously deletes the critical node located by the address information, and records the address information of the current critical node to be deleted to the pending deletion queue. Then the system turns to step 306.

At step 305, the system directly puts the address information of the current critical node to be deleted into the pending deletion queue.

At step 306, the system calculates the deletion time of the critical node according to the predefined deletion delay for the data structure, and puts the address information and deletion time of the critical node into the pending deletion queue for the data structure of the critical node.

At step 307, the timer starts and the system, based on the last recorded identification of the start pending deletion queue for next poll, searches the pending deletion queue for the address information and deletion time of the first critical node for this poll.

At step 308, the system determines whether the deletion time of the critical node is less than or equal to the current system time. If yes, the system executes step 309; if no, the system executes step 310.

At step 309, the system deletes the address information and deletion time of the critical node from the pending deletion queue, locates the critical node by the address information, and deletes the critical node.

At step 310, the system records a (the number of critical nodes polled in the timing period) and b (the number of critical nodes correlated to the current pending deletion queue polled in the timing period).

At step 311, the system determines whether a is less than A. If yes, the system executes step 313; if no, the system executes step 312.

At step 312, the system records the identification of the start pending deletion queue for next poll according to the last polled pending deletion queue. Then the system turns to step 307.

At step 313, the system determines whether b is less than Bm. If yes, the system executes step 314; if no, the system executes step 315.

At step 314, the system starts to poll the deletion time of the next critical node in the current queue. Then the system turns to step 308.

At step 315, the system starts to poll the deletion time of the first critical node in the next pending deletion queue. Then the system turns to step 308.

Figure 4:
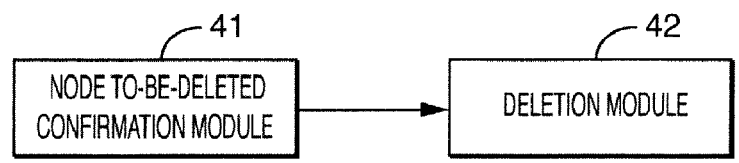
FIG. 4 is a schematic diagram illustrating an apparatus for accelerating the access of a multi-core system to its critical resources.

FIG. 4 is a schematic diagram illustrating an apparatus for accelerating the access of a multi-core system to its critical resources. As shown in FIG. 4, the embodiment comprises a node to-be-deleted confirmation module 41 and a deletion module 42.

The node to-be-deleted confirmation module 41 is used to record the address information of the critical node that the system prepares to delete from a critical resource to the deletion module 42.

The deletion module 42 is used to identify and delete the critical node whose address information is recorded to the current module by the node to-be-deleted confirmation module 41 when the delete conditions are satisfied.

Figure 5:
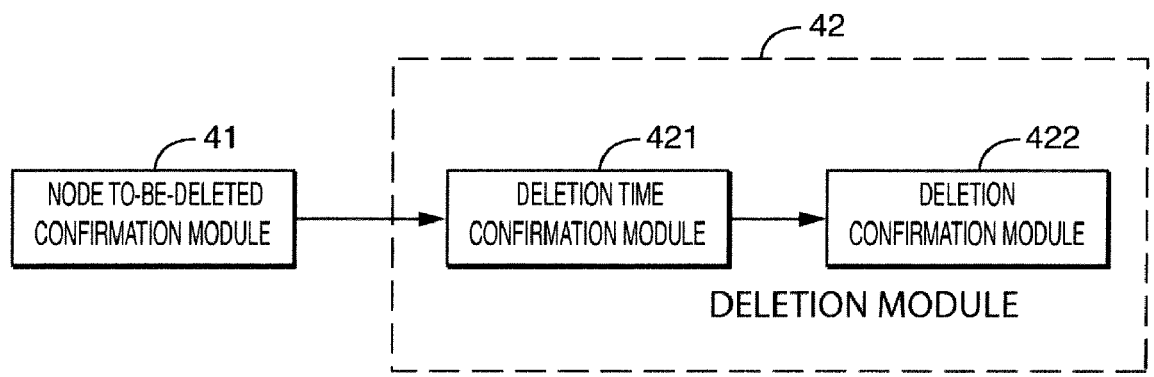
FIG. 5 is a schematic diagram illustrating the apparatus for accelerating the access of a multi-core system to its critical resources in accordance with embodiment 1 of the present invention.

FIG. 5 is a schematic diagram illustrating the apparatus for accelerating the access of a multi-core system to its critical resources in accordance with embodiment 1 of the present invention. Compared with FIG. 4, FIG. 5 differs in:

a deletion module 42, which further includes a deletion time confirmation module 421, and a deletion confirmation module 422. The deletion time confirmation module 421 is used to classify critical nodes by data structure, set the deletion delay for each data structure, identify the data structure of the critical node whose address information is recorded to the current module by the node to-be-delete confirmation module 41 according to mappings between identifications of the data structures and the address information of the critical nodes it stores, further find out the deletion delay of the critical node, calculate the deletion time of the critical node, and record the address information and deletion time to the deletion confirmation module 422.

The deletion confirmation module 422 is used to delete the critical node deletion time recorded to it by the deletion time confirmation module 421 when determining that the critical node deletion time is less than or equal to the system time, and simultaneously delete the address information of the critical node corresponding to the deletion time, and further identify the critical node based on its address information and then delete the critical node.

Figure 6:
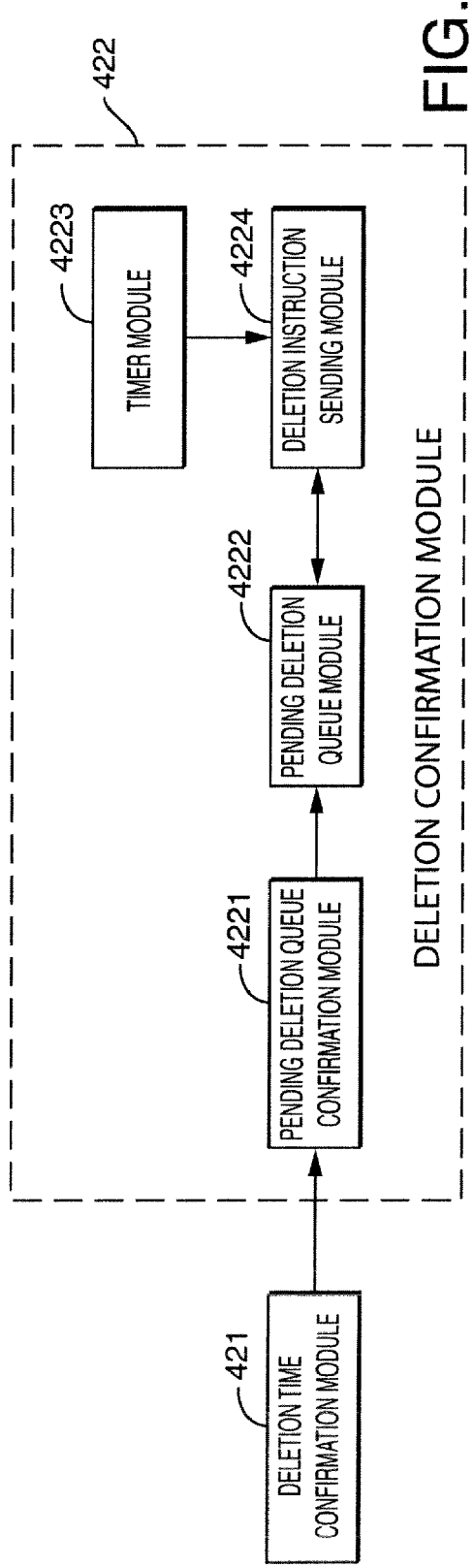
FIG. 6 is a schematic diagram illustrating a deletion confirmation module in accordance with embodiment 1 of the present invention.

As shown in FIG. 6, the deletion confirmation module 422 includes a pending deletion queue confirmation module 4221, a pending deletion queue module 4222, a timer module 4223, and a deletion instruction sending module 4224.

The pending deletion queue confirmation module 4221 is used to store mappings between the address information of critical nodes and pending deletion queue identifications, identify the pending deletion queue for the address information recorded to it by the deletion time confirmation module 421, and put the address information and the deletion time of the critical node in the identified pending deletion queue on the pending deletion queue module 4222.

The pending deletion queue module 4222 is used to create a pending deletion queue for the critical nodes of the same data structure; send the deletion time of the first critical node in a pending deletion queue to the deletion instruction sending module 4224 upon receiving a deletion time acquisition instruction containing the pending deletion queue identification from module 4224; delete the address information and deletion time of the first critical node from the pending deletion queue upon receiving the deletion instruction containing the pending deletion queue identification from module 4224; and further identify the critical node based on its address information and delete the critical node.

The timer module 4223 is used to send a start timing instruction to the deletion instruction sending module 4224 when each timing period starts.

The deletion instruction sending module 4224, upon receiving the start timing instruction sent from the timer module 4223, acquires from the pending deletion queue module 4222 the first critical node deletion time in the last recorded start pending deletion queue for polling based on the identification of the start pending deletion queue. If it is determined that the deletion time is less than or equal to the current system time, the deletion instruction sending module 4224 sends a deletion instruction containing the identification of the current pending deletion queue to the pending deletion queue module 4222. When the number of critical nodes polled in a current pending deletion queue in the timing period equals the predefined value, the deletion instruction sending module 4224 stops polling the current pending deletion queue and acquires the deletion time of the first critical node in the next pending deletion queue. When the total number of critical nodes polled in the current timing period equals the predefined value, the deletion instruction sending module 4224 stops polling and records the identification of the location where the next poll starts.

Figure 7:
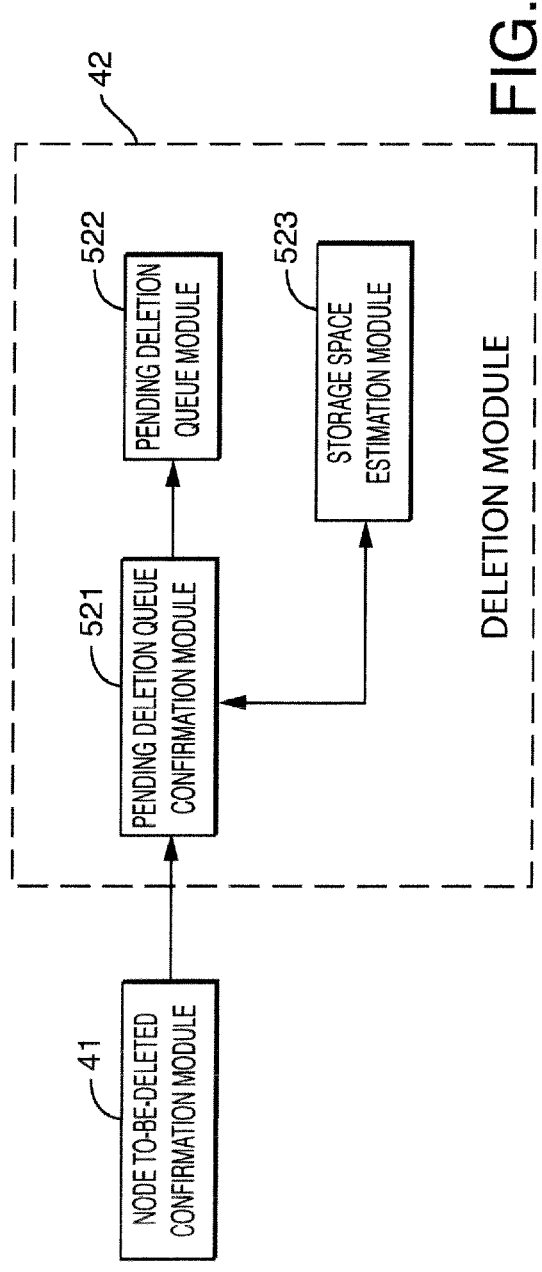
FIG. 7 is a schematic diagram illustrating an apparatus for accelerating the access of a multi-core system to its critical resources in accordance with embodiment 2 of the present invention.

FIG. 7 is a schematic diagram illustrating an apparatus for accelerating the access of a multi-core system to its critical resources in accordance with embodiment 2 of the present invention. As shown in FIG. 7, the deletion module 42 comprises a pending deletion queue confirmation module 521, a pending deletion queue module 522, and a storage space estimation module 523.

The pending deletion queue confirmation module 521 is used to store mappings between address information of critical nodes and pending deletion queue identifications, identify the pending deletion queue for the address information of each critical node recorded to it by the node to-be-deleted confirmation module 41, send an insert request containing the pending deletion queue identification to the storage space estimation module 523. Upon receiving the insert confirmation instruction from the storage space estimation module 523, the pending deletion queue confirmation module 521 puts the address information of the critical node in the pending deletion queue stored on the pending deletion queue module 522.

The pending deletion queue module 522 is used to create a pending deletion queue for each data structure and send the change in the storage space for each pending deletion queue to the storage space estimation module 523. Upon receiving a deletion instruction containing a pending deletion queue identification sent from the storage space estimation module 523, the pending deletion queue module 522 deletes the address information of the critical node that is first put into the pending deletion queue and deletes the critical node. Then the pending deletion queue module 522 sends the deletion completed instruction to the storage space estimation module 523.

The storage space estimation module 523 is used to confirm the storage space for a pending deletion queue according to the storage space change of the pending deletion queue sent from the pending deletion queue module 522 and determine whether the storage space is full when receiving the insert request containing the pending deletion queue identification sent from the pending deletion queue confirmation module 521. If the storage space is full, the storage space estimation module 523 sends the delete instruction containing the pending deletion queue identification to the pending deletion queue module 522.

Upon receiving the deletion completed instruction sent from the pending deletion queue module 522, the storage space estimation module 523 sends the insert confirmation instruction to the pending deletion queue module 522. If the storage space is not full, the storage space estimation module 523 directly sends the insert confirmation instruction to the pending deletion queue confirmation module 521.

It is to be understood that the above description is intended to be illustrative and not restrictive. Various modifications, alternate constructions, and equivalents will be obvious to those with skill in the art. Thus, the scope of the present invention is limited solely by the metes and bounds of the appended claims.

What is claimed is:

1. A method comprising:
   maintaining a critical resource record in computer-readable memory accessible by multiple processors of a multi-core system, wherein the critical resource record contains identifiers of one or more critical nodes;
   placing the identifier of a given critical node in a pending deletion queue to prepare the given critical node for deletion from a critical resource;
   removing the identifier of the given critical node from the critical resource record to enable access to the given critical node by a processor that is already accessing the critical node, and to deny access to a processor seeking to newly access the critical node; and
   deleting the given critical node from the critical resource upon a determination that one or more conditions for deleting the given critical node are satisfied.

2. The method of claim 1, wherein placing the identifier of the given critical node in the pending deletion queue further comprises:
   obtaining a predefined deletion time of the identifier of the given critical node by adding a predefined deletion delay of the identifier of the given critical node to a current system time,
   wherein the one or more conditions for deleting the identifier of the given critical node are satisfied if the predefined deletion time is less than or equal to the current system time.

3. The method of claim 1, further comprising:
   deleting the identifier of the given critical node from the pending deletion queue simultaneously with deleting the given critical node from the critical resource.

4. The method of claim 3, further comprising:
   predefining a polling period and defining a number of critical nodes polled in each polling period for each of one or more pending deletion queues, including a current pending deletion queue; and,
   wherein deleting the given critical node from the critical resource further comprises:
   if the number of critical nodes polled in a current polling period for the current pending deletion queue equals the predefined number of critical nodes polled in each polling period for the current pending deletion queue, polling a next pending deletion queue; and
   if the number of critical nodes polled in a current polling period for the current pending deletion queue does not equal the predefined number of critical nodes polled in each polling period for the current pending deletion queue, continuing to poll a next critical node correlated to the current pending deletion queue.

5. The method of claim 1, further comprising:
   predefining repeating polling periods and defining a number of critical nodes polled in each repeating polling period;
   wherein deleting the given critical node further comprises:
   if a number of critical nodes polled in a given repeating polling period equals the predefined number of critical nodes polled in each polling period, waiting for the next repeating polling period to start; and
   if a number of critical nodes polled in a given repeating polling period does not equal the predefined number of critical nodes polled in each polling period, continuing to poll a next critical node.

6. The method of claim 1, wherein the pending deletion queue has a fixed amount of storage space, and wherein the one or more conditions for deleting the given critical node are satisfied when the pending deletion queue is full.

7. The method of claim 6, wherein the pending deletion queue is a pending deletion queue for critical nodes of a same data structure;
   wherein placing the identifier of the given critical node in the pending deletion queue comprises:
   putting the identifier of the given critical node into the pending deletion queue correlated to the data structure according to a data structure of the given critical node.

8. The method of claim 3, wherein the identifier of the given critical node is address information of the given critical node.

9. An apparatus comprising:
a computer processor;
memory; and
computer-executable instructions stored in the memory and executable by the computer processor to implement a node to-be-deleted confirmation module and a deletion module, wherein:
the node to-be-deleted confirmation module is to communicate an instruction to the deletion module that a core is preparing to delete a critical node from a critical resource, wherein the critical node has an identifier contained in a critical resource record; and
the deletion module is to place the identifier of the critical node in a pending deletion queue to prepare the critical node for deletion from the critical resource, to remove the identifier of the critical node from the critical resource record to enable access to the given critical node by a processor that is already accessing the critical node, and to deny access to a processor seeking to newly access the critical node and to delete the critical node from the critical resource when a delete condition is satisfied.

10. The apparatus of claim 9, wherein the deletion module comprises:
a deletion time confirmation module and a deletion confirmation module, wherein:
the deletion time confirmation module, according to a predefined deletion delay for the critical node, confirms a deletion time of the critical node identified by the critical node identification recorded on the node to-be-deleted confirmation module, and records the identification and deletion time of the critical node to the deletion confirmation module;
the deletion confirmation module deletes the critical node to which the recorded deletion time points when the recorded deletion time is less than or equal to a current system time.

11. The apparatus of claim 10, wherein the deletion confirmation module comprises:
a pending deletion queue confirmation module and a deletion instruction sending module;
wherein the pending deletion queue confirmation module identifies a pending deletion queue for the critical node with the critical node identification, and puts the critical node identification and the deletion time into the pending deletion queue on the pending deletion queue module;
wherein the pending deletion queue module creates a pending deletion queue for each data structure, sends the deletion time of the critical node in the pending deletion queue to the deletion instruction sending module when requested to do so, deletes the deletion time and the critical node identification to which the deletion instruction points, and deletes the critical node;
wherein the deletion instruction sending module sends a deletion instruction to the pending deletion queue when the critical node deletion time requested from the pending deletion queue module is less than or equal to the current system time.

12. The apparatus of claim 9, wherein the deletion module further comprises: a storage space estimation module, which determines whether a storage space is full when the node to-be-deleted confirmation module is to record the critical node identification to the deletion module, wherein if the storage space is full, the storage space estimation module sends an instruction to the deletion module, asking for deleting the first critical node identification stored on the deletion module.

13. The apparatus of claim 9, wherein the deletion module comprises:
a pending deletion queue confirmation module;
a pending deletion queue module; and
a storage space estimation module;
wherein the pending deletion queue confirmation module identifies the pending deletion queue for the recorded critical node identification, sends an insert request containing the critical node identification to the storage space estimation module, and, upon receiving an insert confirmation instruction from the storage space estimation module, records the critical node identification to the pending deletion queue;
wherein the pending deletion queue module creates a pending deletion queue for each data structure, sends the change in storage space for each pending deletion queue to the storage space estimation module, deletes the critical node identification that is first put into the pending deletion queue according to the deletion instruction sent from the storage space estimation module, deletes the critical node, and sends a deletion completed instruction to the space storage estimation module;
wherein the storage space estimation module receives the insert request, and based on the storage space change information determines whether the storage space for the pending deletion queue identified by the pending deletion queue identification contained in the insert request is full; and wherein, if the storage space is full, the storage space estimation module sends out a deletion instruction and upon receiving the deletion completed instruction sends out an insert confirmation instruction; otherwise, if the storage space is not full, it directly sends out an insert confirmation instruction.

14. In a multi-core system in which a critical resource contains at least one critical node, a method comprising:
determining a given critical node to be deleted from the critical resource, wherein the given critical node comprises an identifier contained in a critical resource record;
maintaining the given critical node to be deleted for a timing period during which cores of the multi-core system that are accessing the given critical node complete ongoing access tasks and access by cores of the multi-core system seeking new access to the given critical node is denied, by placing the identifier of the given critical node into a pending deletion queue and removing the identifier of the given critical node from the critical resource record; and
deleting the given critical node from the critical resource when a timing period expires.

15. The method of claim 14, wherein removing the identifier of the given critical node from the critical resource record comprises:
deleting address information of the given critical node to ensure that no cores of the multi-core system is able to access the given critical node.

16. The method of claim 14, further comprising:
enabling a periodic timer to determine the timing period.

17. The method of claim 14, further comprising:
moving the identifier of the given critical node toward the front of the pending deletion queue as other identifiers of critical nodes are added to the pending deletion queue; and deleting the given critical node when at least one of: (i) the identifier of the given critical node is at the front of the queue, and (ii) the queue is full, and (iii) another identifier of a critical node is added to the queue.

18. A computer program, comprising several instructions and used by a computer to execute the methods recited in claim 14.

19. A computer storage medium where the computer program of claim 18 is stored.

* * * * *

UNITED STATES PATENT AND TRADEMARK OFFICE
CERTIFICATE OF CORRECTION

PATENT NO. : 8,190,857 B2  Page 1 of 1
APPLICATION NO. : 12/282779
DATED : May 29, 2012
INVENTOR(S) : Dan Meng et al.

It is certified that error appears in the above-identified patent and that said Letters Patent is hereby corrected as shown below:

In Sheet 1 of 6 (FIG. 1) box 101, delete "STURCTURE" and insert -- STRUCTURE --.

In Sheet 1 of 6 (FIG. 1) box 101, delete "DET" and insert -- SET --.

In Sheet 3 of 6 (FIG. 3A) diamond 303, delete "PENDIING" and insert -- PENDING --.

In Sheet 4 of 6 (FIG. 3B) box 315, delete "FRIST" and insert -- FIRST --.

In column 1, line 46, delete "the".

In column 3, line 31, "At step 102" should not be indented.

In column 10, line 27, in Claim 13, delete "space storage" and insert -- storage space --, therefor.

In column 12, line 2, in Claim 18, delete "methods" and insert -- method as --, therefor.

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,190,857 B2 | Page 1 of 1 |
| APPLICATION NO. | : 12/282779 | |
| DATED | : May 29, 2012 | |
| INVENTOR(S) | : Dan Meng et al. | |

It is certified that error appears in the above-identified patent and that said Letters Patent is hereby corrected as shown below:

Cover page insert Foreign Priority Application item [30] -- CN 200610127073.2 dated September 26, 2006 --, therefor.

Signed and Sealed this
Fifth Day of February, 2013

Teresa Stanek Rea
*Acting Director of the United States Patent and Trademark Office*